United States Patent

[11] 3,581,592

| [72] | Inventors | Karl H. Roehrs<br>Bellevue, Wash.;<br>Josef Berkes, Siegen, Westphalia, Germany |
|---|---|---|
| [21] | Appl. No. | 814,696 |
| [22] | Filed | Apr. 9, 1969 |
| [45] | Patented | June 1, 1971 |
| [73] | Assignee | H. A. Waldrich G.m.b.H.<br>Siegen, Westphalia, Germany |
| [32] | Priority | Apr. 10, 1968 |
| [33] |  | Germany |
| [31] |  | P 17 50 234.0 |

[54] WORM GEAR
3 Claims, 4 Drawing Figs.

[52] U.S. Cl. .................................................. 74/424.6,
74/464
[51] Int. Cl. ..................................................... F16h 1/18,
F16h 55/02
[50] Field of Search .......................................... 74/424.6,
425, 464, 465

[56] References Cited
UNITED STATES PATENTS

| 3,188,877 | 6/1965 | Schmidt ....................... | 74/425 |
|---|---|---|---|
| 3,365,974 | 1/1968 | Lieberman ................... | 74/425 |
| 3,468,179 | 9/1969 | Sedgwick et al. ............. | 74/425 |

FOREIGN PATENTS

| 1,261,122 | 4/1961 | France ....................... | 74/425 |

*Primary Examiner*—Leonard H. Gerin
*Attorney*—Richards & Geier

ABSTRACT: A worm gear having a worm and a worm rack is characterized by circulating balls extending over the entire length of the worm gears between the worm and the worm rack, ball supports adjacent the circumferential surface of the worm, a channellike ball outlet upon one end of the worm, a return bore passage extending in the longitudinal direction and a channellike ball inlet to the worm gears.

PATENTED JUN 1 1971

3,581,592

INVENTORS
K.-H. Roehrs and J. Berkes
BY
Richards & Geier
ATTORNEYS

WORM GEAR

This invention relates to a worm gear having a worm and a worm rack.

In existing worm gears the profile of the worm meshes directly with the profile of the worm rack. These constructions have the following drawbacks:

When the worm gear is being started, a substantial amount of friction takes place, the so-called starting friction. The friction of the gears distinctly increases with an increase in the number of revolutions. Lubrication of the gear requires continuous attendance and a substantial consumption of the lubricant. Another drawback is the required run-in time of these gears.

An object of the present invention is to eliminate the drawbacks of existing worm gears.

Another object is the provision of a worm gear which will have a small starting friction, small influence of the number of revolutions upon friction, small requirements for lubrication attendance and small consumption of lubricant, combined with shorter run-in time and also having the advantages of smaller heat development and greater lifting power.

Other objects will become apparent in the course of the following specification.

In the accomplishment of the objectives of the present invention it was found desirable to provide circulating balls extending over the entire length of the worm gears between the worm and the worm rack, ball supports around the circumferential surface of the worm, as well as a channellike ball outlet upon one end of the worm, a return bore passage extending in the longitudinal direction and a channellike ball inlet to the worm gears.

A different embodiment of the present invention is characterized by the provision of a separate ball circulation upon each flank of the worm profile.

The balls can rotate in a groove adjacent the circumferential base of the worm. The balls can be guided adjacent the worm heads by a conducting band. The band can be fixed to the heads of the worm profile and its thickness is smaller than the head play. Sideways the band should extend at least beyond the middle of the balls, namely, the band should extend at least beyond the middle of the balls to one side or to both sides of the profile, depending as to whether circulation of the balls is provided upon one flank of worm profile or upon each flank of the worm profile.

According to a further embodiment of the present invention the balls can be also guided through a casing which is torsionally fixed relatively to the worm; for example, the casing can be attached to the worm support. In that case the inlet and the outlet of the balls can take place either through separate covers fixed upon each front surface of the worm, or by grooves provided upon the front surfaces of the worm and the cover closing these surfaces, or by a partial shaping of one or the other front surface of the worm and of one of the other cover closing the front surface.

The invention will appear more clearly from the following detailed description when taken in connection with the accompanying drawing, showing by way of example only, preferred embodiments of the inventive idea.

Figure 1:
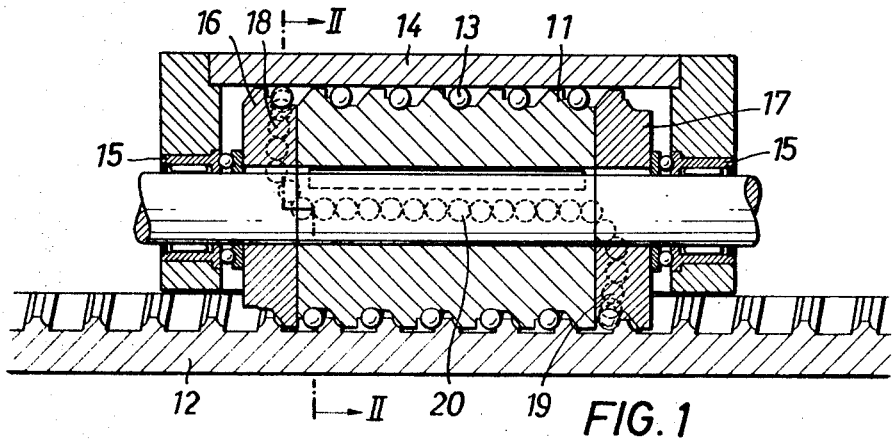
FIG. 1 is a longitudinal section through a worm gear constructed in accordance with the present invention.
Figure 2:
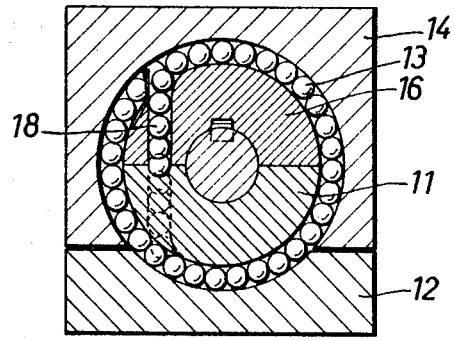
FIG. 2 is a transverse section along the line II–II of FIG. 1.

FIG. 1 shows a worm 11 and a worm rack 12. Balls 13 are guided by a casing 14 which is fixed against rotation relatively to the worm 11. The casing 14 is mounted in bearings 15 for the worm gear. A cover 16 is fixed upon one front surface of the worm 11, while another cover 17 is fixed upon the other front surface of the worm 11. Suitable passages provide an inlet 19 for the balls in the cover 17 and an outlet 18 for the balls in the cover 16. A guiding passage 20 extending longitudinally through the worm 11 connects the ball outlet with the ball inlet.

Figures 3, 4:
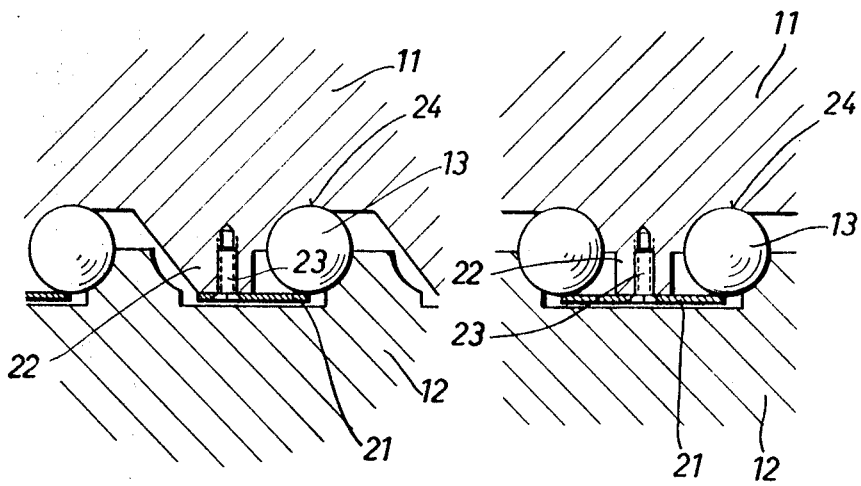
FIG. 3 is a partial section of a construction wherein the balls circulate upon each flank of the worm profile.
FIG. 4 is a partial section of a different construction wherein the balls circulate upon one flank of the worm profile.

FIG. 3 illustrates an embodiment of the invention having a guiding band 21 as holder for the balls. The band 21 is fixed upon the head of the worm profile 22 by a countersunk screw 23.

Obviously the band 21 can be also attached by soldering, welding, gluing, etc.

The band 21 extends to both sides of the worm profile 22 beyond the middle of the balls 13. The balls 13 move in a groove 24 close to the circumferential bottom of the worm 11.

FIG. 4 illustrates another embodiment of the invention which also includes a band 21 as a ball support. However, in this construction the balls 13 move only along one side of the worm profile 22'.

We claim:

1. A worm gear, comprising a worm, a worm rack, a plurality of balls extending over the entire length of the worm gears between said worm and said worm rack, a ball-supporting band fixed to the head of the worm profile, the thickness of the band being less than the play between said worm and said worm rack, said band extending sideways at least beyond the center of the balls supported by the band, means forming an inlet passage for the balls adjacent one end of the worm, means forming an outlet passage for the balls adjacent the opposite end of the worm, and means forming a longitudinal passage for the balls which is connected with said inlet passage and said outlet passage.

2. A worm gear, comprising a worm, a worm rack, a plurality of balls extending over the entire length of the worm gears between said worm and said worm rack, means supporting said balls around said worm, a cover fixed to a front surface of said worm and having an inlet passage for the balls, another cover fixed to the opposite front surface of said worm and having an outlet passage for the balls, and means forming a longitudinal passage for the balls which is connected with said inlet passage and said outlet passage.

3. A worm gear, comprising a worm, a worm rack, a plurality of balls extending over the entire length of the worm gears between said worm and said worm rack, means supporting said balls around said worm and having a fixed casing located above said worm and engaging said balls, means forming an inlet passage for the balls adjacent one end of the worm, means forming an outlet passage for the balls adjacent the opposite end of the worm, said two means comprising grooves formed in the front surfaces of the worm for the inlet and outlet of the balls and covers covering said grooves, parts of said grooves being formed in said covers, and means forming a longitudinal passage for the balls which is connected with said inlet passage and said outlet passage.